United States Patent
Lee

(10) Patent No.: US 11,870,099 B2
(45) Date of Patent: Jan. 9, 2024

(54) BATTERY PACK

(71) Applicant: Samsung SDI Co., Ltd., Yongin-si (KR)

(72) Inventor: Seokbong Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 94 days.

(21) Appl. No.: 17/236,229

(22) Filed: Apr. 21, 2021

(65) Prior Publication Data

US 2021/0351481 A1 Nov. 11, 2021

(30) Foreign Application Priority Data

May 11, 2020 (KR) .................. 10-2020-0056147

(51) Int. Cl.
*H01M 50/519* (2021.01)
*H01M 50/284* (2021.01)

(52) U.S. Cl.
CPC ....... *H01M 50/519* (2021.01); *H01M 50/284* (2021.01)

(58) Field of Classification Search
CPC .................... H01M 50/519; H01M 50/284
USPC ........................................................ 429/163
See application file for complete search history.

(56) References Cited

U.S. PATENT DOCUMENTS

| | | | |
|---|---|---|---|
| 9,017,836 B2 | 4/2015 | Park et al. | |
| 2012/0276419 A1 | 11/2012 | Park | |
| 2013/0011700 A1 | 1/2013 | Park et al. | |
| 2014/0120401 A1 | 5/2014 | Shin et al. | |
| 2014/0193670 A1 | 7/2014 | Ahn | |
| 2016/0028047 A1 | 1/2016 | Park | |
| 2016/0308255 A1 | 10/2016 | Han | |
| 2017/0125777 A1 | 5/2017 | Lee et al. | |
| 2019/0181418 A1 | 6/2019 | Son et al. | |
| 2021/0043883 A1 | 2/2021 | Kim et al. | |

FOREIGN PATENT DOCUMENTS

| | | |
|---|---|---|
| CN | 102867981 A | 1/2013 |
| CN | 209515832 U | 10/2019 |
| JP | 5201820 B2 | 6/2013 |
| KR | 10-0635732 B1 | 10/2006 |
| KR | 10-2014-0096197 A | 8/2014 |
| KR | 10-1956932 B1 | 6/2019 |
| WO | WO 2020-036439 A1 | 2/2020 |

OTHER PUBLICATIONS

Extended European Search Report from corresponding European Application No. 21173431.4, Extended European Search Report dated Oct. 6, 2021 (10 pgs.).
Chinese Office Action dated Dec. 2, 2022 issued in corresponding Chinese Application No. 202110498382.5 (21 pages, including 13 pages of English translation).

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

A battery pack includes: a battery cell; a main circuit board electrically connected to the battery cell and extending in a first direction; and a flexible circuit board extending in the first direction in parallel with the main circuit board and including an external connection terminal located at a position outside the main circuit board, and the main circuit board and the flexible circuit board respectively include first and second coupling pads overlapping each other and coupled to each other.

24 Claims, 6 Drawing Sheets

BATTERY PACK

CROSS-REFERENCE TO RELATED APPLICATION

This application claims priority to and the benefit of Korean Patent Application No. 10-2020-0056147, filed on May 11, 2020 in the Korean Intellectual Property Office, the entire disclosure of which is incorporated herein by reference.

BACKGROUND

1. Field

Aspects of one or more embodiments relate to a battery pack.

2. Description of Related Art

In general, secondary batteries refer to batteries that can be repeatedly charged and recharged unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (battery packs) each including a plurality of cells connected to each other as a unit are used according to the types of devices that employ secondary batteries.

Small mobile devices such as cellular phones may be operated for a certain time (e.g., a predetermined time) using single-cell secondary batteries. However, battery packs having high-output, high-capacity features may be suitable for devices having long operating times and consuming large amounts of power, such as electric vehicles and hybrid electric vehicles. The output voltages or currents of battery packs may be increased by adjusting the number of battery cells included in the battery packs.

SUMMARY

According to an aspect of one or more embodiments, a battery pack is provided in which the rigidity of a flexible circuit board connected to an external connection terminal is enhanced such that even when tensile or bending force is applied to the flexible circuit board through the external connection terminal, the flexible circuit board connected to the external connection terminal may not be damaged or the coupling between the flexible circuit board and other circuit boards may not be damaged.

Additional aspects will be set forth, in part, in the description which follows and, in part, will be apparent from the description, or may be learned by practice of the presented embodiments of the disclosure.

According to one or more embodiments, a battery pack includes: a battery cell; a main circuit board electrically connected to the battery cell and extending in a first direction; and a flexible circuit board extending in the first direction in parallel with the main circuit board and including an external connection terminal located at a position outside the main circuit board, wherein the main circuit board and the flexible circuit board respectively include a plurality of first coupling pads and a plurality of second coupling pads which overlap each other and are coupled to each other.

In one or more embodiments, the plurality of first coupling pads of the main circuit board and the plurality of second coupling pads of the flexible circuit board may be at positions corresponding to each other and may have different shapes.

In one or more embodiments, the plurality of first coupling pads of the main circuit board may include a first-row coupling pad and a second-row coupling pad which are spaced from each other in a second direction crossing the first direction, and the plurality of second coupling pads of the flexible circuit board may include a first-row coupling pad and a second-row coupling pad which are spaced from each other in the second direction.

In one or more embodiments, among the plurality of first coupling pads of the main circuit board and the plurality of second coupling pads of the flexible circuit board, each of the first-row coupling pads arranged relatively close to the external connection terminal in the second direction may include at least two coupling pads arranged in the first direction.

In one or more embodiments, among the plurality of first coupling pads of the main circuit board and the plurality of second coupling pads of the flexible circuit board, each of the second-row coupling pads arranged relatively distant from the external connection terminal in the second direction may include a single coupling pad arranged in the first direction.

In one or more embodiments, the plurality of first coupling pads of the main circuit board may include an outermost coupling pad and an inner coupling pad in the first direction from the main circuit board to the flexible circuit board, and the plurality of second coupling pads of the flexible circuit board may include an outermost coupling pad and an inner coupling pad in the first direction from the main circuit board to the flexible circuit board.

In one or more embodiments, the outermost coupling pads may be longer than the inner coupling pads in the first direction.

In one or more embodiments, among the plurality of first coupling pads of the main circuit board and the plurality of second coupling pads of the flexible circuit board, each of the first-row coupling pads may include an outermost coupling pad and an inner coupling pad in the first direction.

In one or more embodiments, among the plurality of first coupling pads of the main circuit board and the plurality of second coupling pads of the flexible circuit board, each of the second-row coupling pads may include a single coupling pad in the first direction as an outermost coupling pad.

In one or more embodiments, outermost coupling pads of the first-row coupling pads and outermost coupling pads of the second-row coupling pads may be located at positions corresponding to each other in the first direction.

In one or more embodiments, among the plurality of first coupling pads of the main circuit board and the plurality of second coupling pads of the flexible circuit board, the outermost coupling pads may have a rectangular shape with a length in the first direction being greater than a width in the second direction, and the inner coupling pads may have a square shape with a length in the first direction being equivalent to a width in the second direction.

In one or more embodiments, coupling holes may be formed in the plurality of second coupling pads of the flexible circuit board to expose portions of the plurality of first coupling pads of the main circuit board through the coupling holes.

In one or more embodiments, the main circuit board and the flexible circuit board may be coupled to each other via a bonding material which is on the plurality of first coupling pads exposed through the coupling holes and which is on the plurality of second coupling pads around the coupling holes.

In one or more embodiments, the plurality of second coupling pads of the flexible circuit board may include an outermost coupling pad and an inner coupling pad in the first direction, and the coupling holes may include an outermost coupling hole formed in the outermost coupling pad and an inner coupling hole formed in the inner coupling pad.

In one or more embodiments, the outermost coupling hole may extend longer than the inner coupling hole in the first direction.

In one or more embodiments, the outermost coupling hole may include an end portion having a width in the first direction that increases from an open side thereof in a second direction crossing the first direction, and the inner coupling hole may include an end portion having a width in the first direction that decreases from an open side thereof in the second direction.

In one or more embodiments, the end portion having an increased width and the end portion having a decreased width may be end portions at which the outer coupling hole and the inner coupling hole respectively end in the second direction.

In one or more embodiments, the outermost coupling hole may be elongated in the first direction and may include round end portions at opposite ends thereof in the first direction.

In one or more embodiments, the outermost coupling hole may be formed in the outermost coupling pad at a relatively inner position of the outermost coupling pad in the first direction.

In one or more embodiments, the outermost coupling hole may be formed at a position closer to an inner end portion of the outermost pad than to an outer end portion of the outermost coupling pad in the first direction from the main circuit board to the flexible circuit board.

In one or more embodiments, an outer distance from the outermost coupling hole to the outer end portion of the outermost coupling pad may be greater than an inner distance from the outermost coupling hole to the inner end portion of the outermost coupling pad.

In one or more embodiments, the inner coupling hole may be formed in the inner coupling pad at a center position of the inner coupling pad in the first direction.

In one or more embodiments, the inner coupling hole may be formed at a center position between an outer end portion and an inner end portion of the inner coupling pad in the first direction from the main circuit board to the flexible circuit board.

In one or more embodiments, the main circuit board may include a rigid circuit board, and the flexible circuit board may include a flexible film type circuit board.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
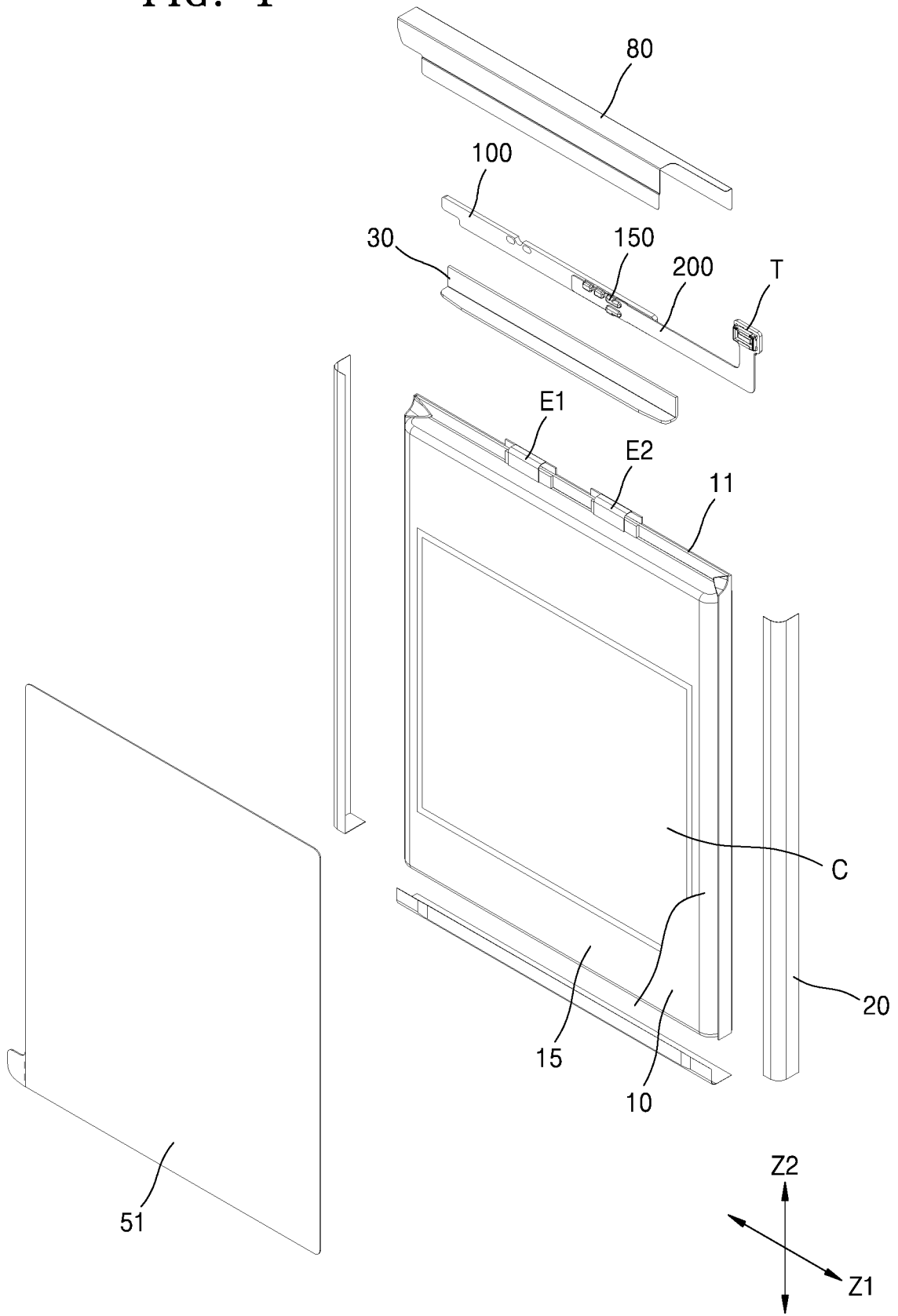
FIG. 1 is an exploded perspective view illustrating a battery pack according to an embodiment.

Reference will now be made in further detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, a battery pack will be described with reference to the accompanying drawings according to embodiments.

Figure 2:
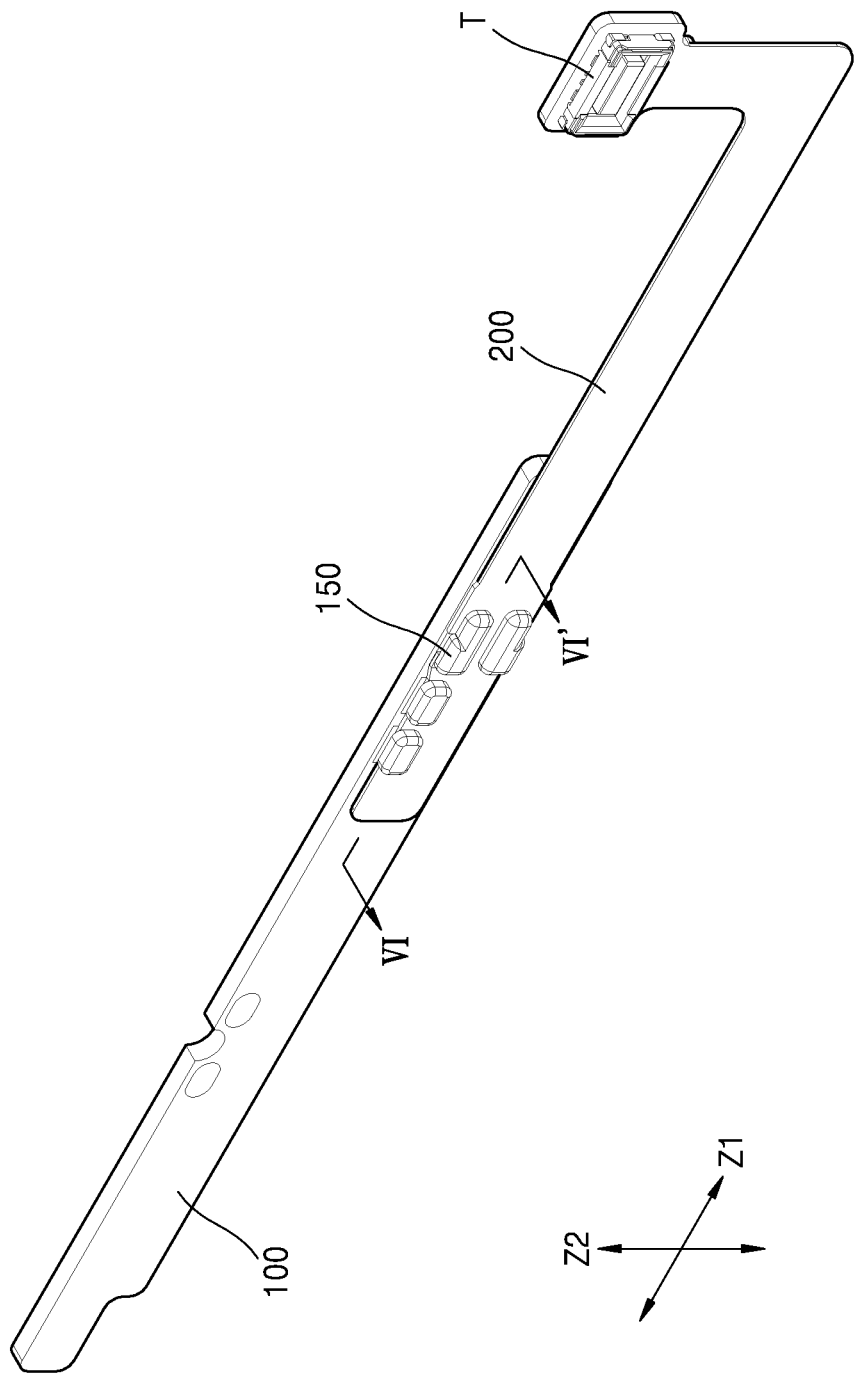
FIG. 2 is a perspective view illustrating a main circuit board and a flexible circuit board shown in FIG. 1.
Figure 3:
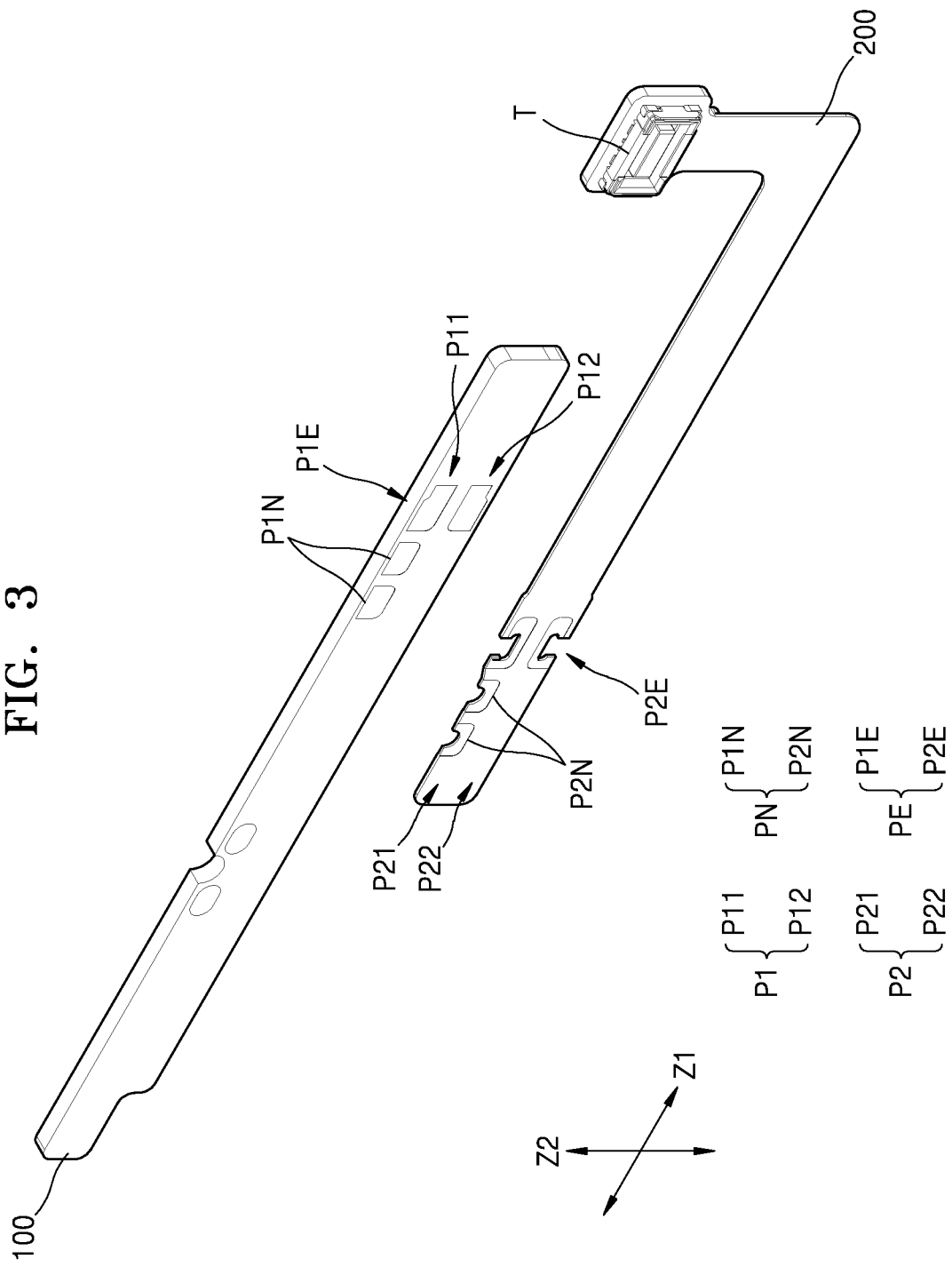
FIG. 3 is an exploded perspective view illustrating the main circuit board and the flexible circuit board shown in FIG. 2.
Figure 4:
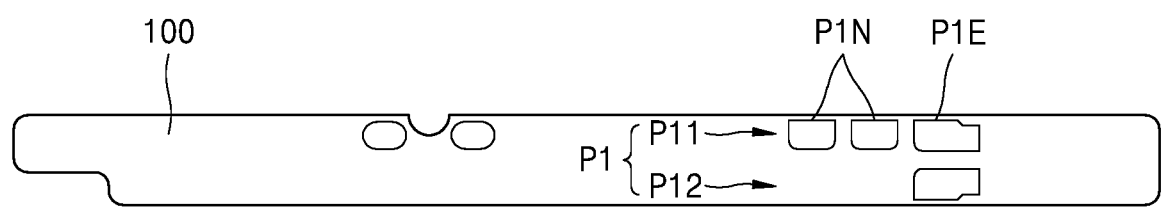
FIG. 4 is a view illustrating structures of first coupling pads of the main circuit board shown in FIG. 3.
Figure 4:
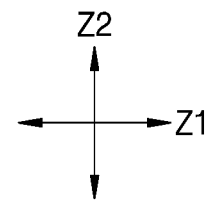
Figure 5:
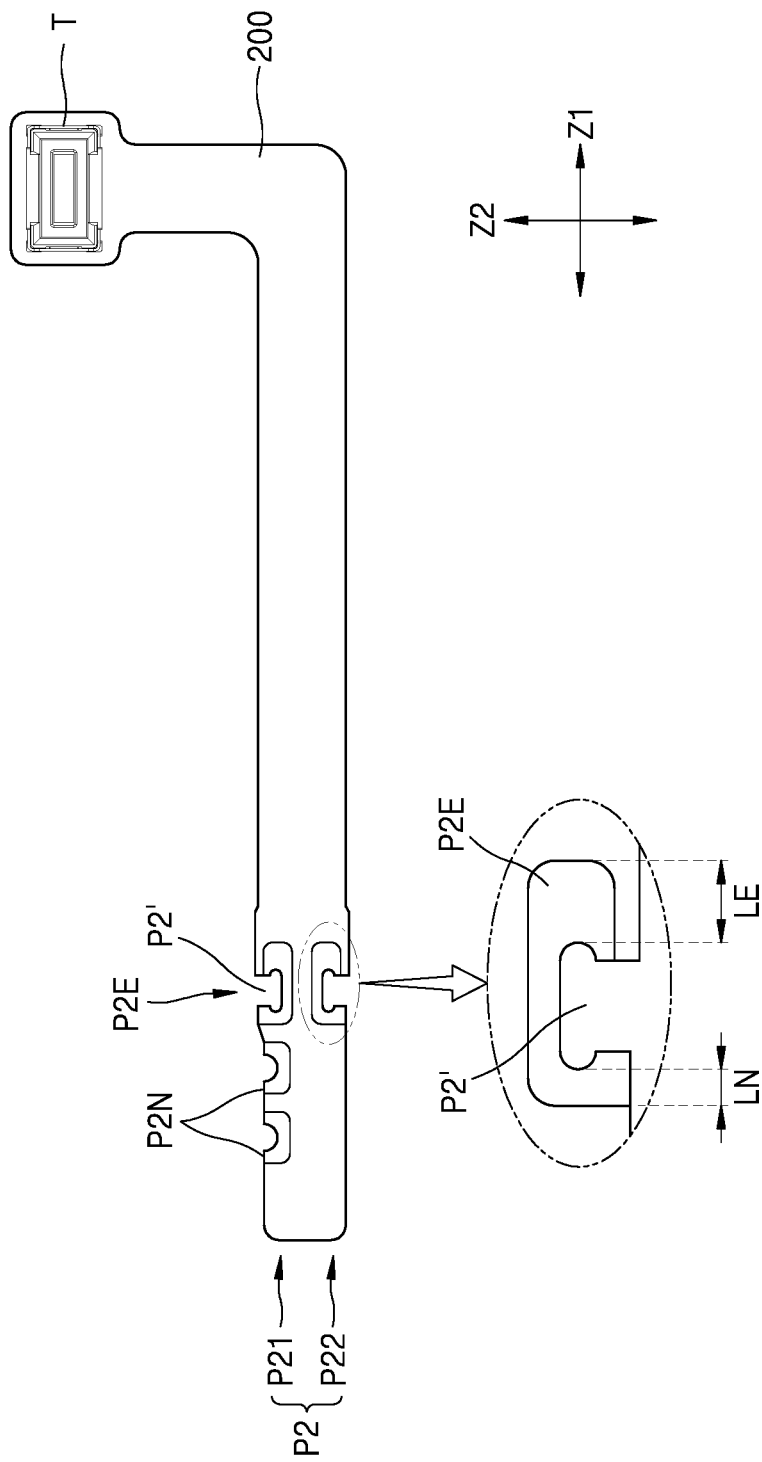
FIG. 5 is a view illustrating structures of second coupling pads of the flexible circuit board shown in FIG. 3.
Figure 6A:
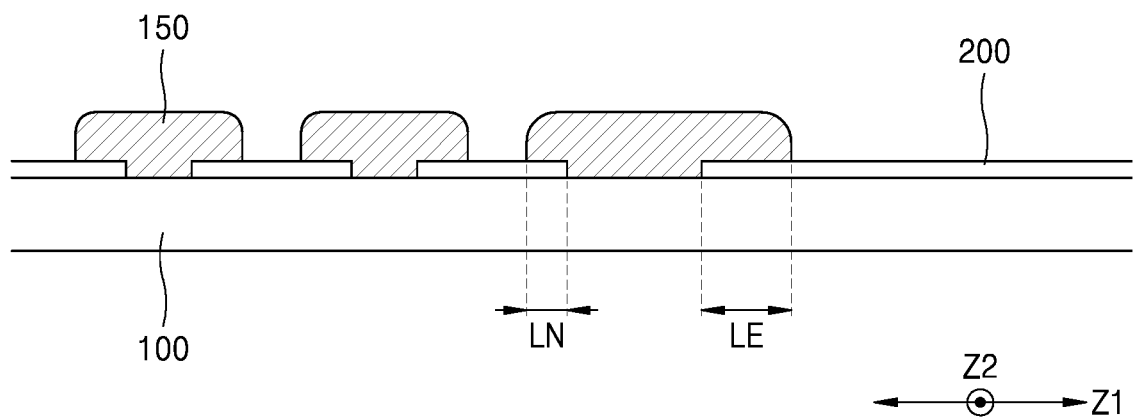
FIGS. 6A and 6B are cross-sectional views taken along the line VI-VI' of FIG. 2 respectively illustrating a state in which the flexible circuit board is not bent and a state in which the flexible circuit board is bent.
Figure 6B:
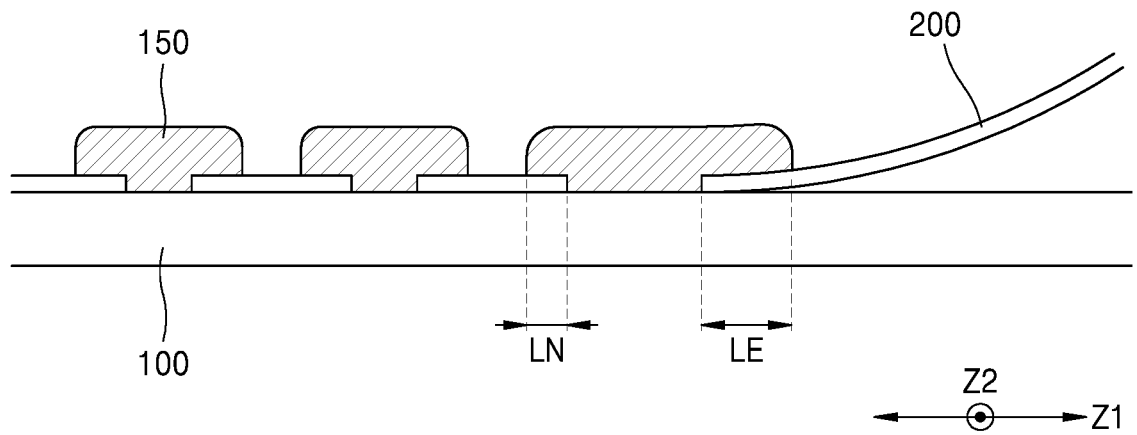

FIG. 1 is an exploded perspective view illustrating a battery pack according to an embodiment; FIG. 2 is a perspective view illustrating a main circuit board and a flexible circuit board shown in FIG. 1; FIG. 3 is an exploded perspective view illustrating the main circuit board and the flexible circuit board shown in FIG. 2; FIG. 4 is a view illustrating structures of first coupling pads of the main circuit board shown in FIG. 3; FIG. 5 is a view illustrating structures of second coupling pads of the flexible circuit board shown in FIG. 3; and FIGS. 6A and 6B are cross-sectional views taken along the line VI-VI' of FIG. 2 respectively illustrating a state in which the flexible circuit board is not bent and a state in which the flexible circuit board is bent.

Referring to FIGS. 1 to 6B, according to an embodiment, a battery pack may include: a battery cell C; a main circuit board 100 electrically connected to the battery cell C and extending in a first direction Z1; a flexible circuit board 200 extending parallel with the main circuit board 100 in the first direction Z1 and including an external connection terminal T formed at a position outside the main circuit board 100, and the main circuit board 100 and the flexible circuit board 200 may include a plurality of first and second coupling pads P1 and P2 which overlap each other and are arranged in the first direction Z1.

In an embodiment, the battery cell C may include: an electrode assembly 10; and a casing 15 which seals the electrode assembly 10 together with an electrolyte (not shown) and includes a terrace portion 11 from which first and second electrodes E1 and E2 electrically connected to the electrode assembly 10 extend outward. As described later, the main circuit board 100 electrically connected to the first and second electrodes E1 and E2 may be arranged on the terrace portion 11.

Although not shown in FIGS. 1 to 6B, the electrode assembly 10 may include: first and second electrode plates having different polarities; and a separator arranged between the first and second electrode plates. The electrode assembly 10 is formed in a rolled type by winding the first and second electrode plates with the separator therebetween, or in a stacked type by stacking a plurality of first and second electrode plates with separators therebetween.

The main circuit board 100, to which the first and second electrodes E1 and E2 are connected, may be arranged on the terrace portion 11 from which the first and second electrodes E1 and E2 of the battery cell C extend outward. Charge-discharge current of the battery cell C may flow, via the main circuit board 100 connected to the first and second electrodes E1 and E2, to the external connection terminal T of the flexible circuit board 200, which is connected side by side to the main circuit board 100.

The main circuit board 100 may be electrically connected to the battery cell C, and, for example, the main circuit board 100 may be connected to the first and second electrodes E1 and E2 of the battery cell C to form a charge-discharge path of the battery cell C. The main circuit board 100 may be electrically connected to the flexible circuit board 200 including the external connection terminal T, and may form a charge-discharge path between the battery cell C and the external connection terminal T of the flexible circuit board 200. The main circuit board 100 may be arranged on the terrace portion 11 of the battery cell C from which the first and second electrodes E1 and E2 extend outward, and may extend in the first direction Z1 in parallel with the terrace portion 11. As described later, the flexible circuit board 200 electrically connected to the main circuit board 100 may also extend in the first direction Z1 parallel to the main circuit board 100. For reference, throughout the present specification, the first direction Z1 may refer to a length direction of the main circuit board 100 and the flexible circuit board 200, and, for example, the first direction Z1 may refer to a direction from the main circuit board 100 toward the flexible circuit board 200. In addition, throughout the present specification, a second direction Z2 may refer to a width direction of the main circuit board 100 and the flexible circuit board 200 or a direction crossing the first direction Z1, for example, a direction perpendicular to the first direction Z1.

In an embodiment, unlike the flexible circuit board 200, the main circuit board 100 may be a rigid circuit board which is harder than the flexible circuit board 200, and, while forming a charge-discharge path between the battery cell C and the flexible circuit board 200, the main circuit board 100 may control the charge and discharge operations of the battery cell C to cope with abnormal situations such as overheating, overcharging, and overdischarging of the battery cell C. To this end, the main circuit board 100 may include a plurality of circuit devices (not shown). For example, the main circuit board 100 may function as a battery management system (BMS) which monitors state information, such as the temperature, voltage, or current of the battery cell C and takes protective measures, such as stopping the charge or discharge operation of the battery cell C when abnormal situations are detected. As described above, in an embodiment, unlike the flexible circuit board 200, the main circuit board 100 may be a rigid circuit board which is harder than the flexible circuit board 200. In various other embodiments, however, the main circuit board 100 may be a flexible film-type circuit board like the flexible circuit board 200.

The flexible circuit board 200 may extend side by side with the main circuit board 100 in the first direction Z1. The main circuit board 100 and the flexible circuit board 200 may be electrically connected to each other by coupling together the first and second coupling pads P1 and P2 which are respectively formed on the main circuit board 100 and the flexible circuit board 200. For example, the first coupling pads P1 formed on the main circuit board 100 and the second coupling pads P2 formed on the flexible circuit board 200 may be coupled to each other using a bonding material 150, such as a soldering material, thereby coupling the main circuit board 100 and the flexible circuit board 200 to each other.

The first and second coupling pads P1 and P2 may be respectively formed on the main circuit board 100 and the flexible circuit board 200 at corresponding positions to be superimposed on each other. However, as described later, the first and second coupling pads P1 and P2 may have different shapes. The first and second coupling pads P1 and P2 may be arranged at a plurality of positions in the first direction Z1 to effectively resist tension acting in the first direction Z1. For example, the external connection terminal T may be formed on the flexible circuit board 200, and the first and second coupling pads P1 and P2 for coupling the main circuit board 100 and the flexible circuit board 200 to each other may be provided at a plurality of positions such that even when tension acts on the flexible circuit board 200 through the external connection terminal T in the first direction Z1 during a process of connecting the external connection terminal T to an external set device (not shown, for example, an electronic device using the battery pack as a driving power source), the coupling between the flexible circuit board 200 and the main circuit board 100 may not be damaged.

The first and second coupling pads P1 and P2 may include first-row coupling pads P11 and P21 and second-row coupling pads P12 and P22 which are separate, or spaced, from each other in the second direction Z2 crossing the first direction Z1. In an embodiment, the first-row and second-row coupling pads P11, P21, P12, and P22 may include different numbers of coupling pads. For example, the first-row coupling pads P11 and P21, which are relatively close to the external connection terminal T in the second direction Z2, may have more coupling pads than the second-row coupling pads P12 and P22, which are relatively distant from the external connection terminal T in the second direction Z2. For example, the first-row coupling pads P11 and P21, which are relatively close to the external connection terminal T in the second direction Z2, may include a relatively large number of coupling pads to effectively resist tension that may occur in a process of connecting the external connection terminal T to an external set device (for example, an electronic device using the battery pack as a driving power source), and the second-row coupling pads P12 and P22 may include a relatively small number of coupling pads to save a space occupied by the second-row coupling pads P12 and P22 and use the saved space as a mounting space for circuit devices.

The first-row and second-row coupling pads P11, P21, P12 and P22 will now be described in further detail. Since the first coupling pads P1 of the main circuit board 100 and the second coupling pads P2 of the flexible circuit board 200 overlap each other and are coupled to each other, the first and second coupling pads P1 and P2 may be at positions corresponding to each other, and, thus, the first coupling pads P1 of the main circuit board 100 and the second coupling pads P2 of the flexible circuit board 200 may include the first-row and second-row coupling pads P11, P21, P12, P22.

The first-row coupling pads P11 and P21 of the first coupling pads P1 of the main circuit board 100 and the second coupling pads P2 of the flexible circuit board 200 may include at least two coupling pads arranged in the first direction Z1. In an embodiment, there may be only a single second-row coupling pad P12 and a single second-row coupling pad P22 in the first direction Z1 among the first coupling pads P1 of the main circuit board 100 and the second coupling pads P2 of the flexible circuit board 200.

As described above, the first-row coupling pads P11 and P21 of the first coupling pads P1 of the main circuit board 100 and the second coupling pads P2 of the flexible circuit board 200 are relatively close to the external connection terminal T in the second direction Z2, and the second-row coupling pads P12 and P22 of the first coupling pads P1 of the main circuit board 100 and the second coupling pads P2 of the flexible circuit board 200 are relatively distant from the external connection terminal T in the second direction Z2. Thus, in an embodiment, the number of the first-row coupling pads P11 and P21, which are relatively close to the external connection terminal T in the second direction Z2, is relatively large to effectively resist tension that may occur, for example, in a process of connecting the external connection terminal T to an external set device (not shown, for example, an electronic device using the battery pack as a driving power source).

In an embodiment, the first coupling pads P1 of the main circuit board 100 may include outermost coupling pads P1E and inner coupling pads P1N in the first direction Z1, and the second coupling pads P2 of the flexible circuit board 200 may include outermost coupling pads P2E and inner coupling pads P2N in the first direction Z1. Throughout the present specification, the outermost coupling pads P1E and P2E may refer to coupling pads located at outermost positions in the first direction Z1, for example, in the first direction Z1 from the main circuit board 100 to the flexible circuit board 200, and no coupling pads are outside the outermost coupling pads P1E and P2E in the first direction Z1. In an embodiment, the first-row and second-row coupling pads P11, P21, P12, and P22 may include the outermost coupling pads P1E and P2E. The first-row and second-row coupling pads P11, P21, P12, and P22 may be formed at positions corresponding to each other in the first direction Z1, and, for example, the outermost coupling pads P1E and P2E of the first-row and second-row coupling pads P11, P21, P12, and P22 may be formed at corresponding positions (outermost positions) in the first direction Z1.

The first-row coupling pads P11 may include at least two coupling pads arranged in the first direction Z1, and the first-row coupling pads P21 may include at least two coupling pads arranged in the first direction Z1. In an embodiment, the first-row coupling pads P11 may include three coupling pads arranged in the first direction Z1, and the first-row coupling pads P21 may include three coupling pads arranged in the first direction Z1. In this case, the first-row coupling pads P11 and P21 may include outermost coupling pads P1E and P2E and inner coupling pads P1N and P2N in the first direction Z1.

In an embodiment, there may be only a single second-row coupling pad P12 and only a single second-row coupling pad P22 in the first direction Z1, and, in this case, the second-row coupling pad P12 and the second-row coupling pad P22 may respectively correspond to an outermost coupling pad P1E and an outermost coupling pad P2E. In an embodiment, when there are only a single second-row coupling pad P12 and only a single second-row coupling pad P22 in the first direction Z1, the second-row coupling pad P12 and the second-row coupling pad P22 may be the outermost coupling pads P1E and P2E of the second-row coupling pads P12 and P22 which are provided at outermost positions in the first direction Z1 corresponding to the outermost coupling pads P1E and P2E of the first-row coupling pads P11 and P21 to effectively cope with tension acting in the first direction Z1.

The first-row and second-row coupling pads P11, P21, P12, and P22 may be formed at positions facing each other in the second direction Z2 and may be symmetrical with each other. For example, among the first-row and second-row coupling pads P11, P21, P12, and P22, the outermost coupling pads P1E and P2E in the first direction Z1 may be provided at positions facing each other in the second direction Z2 and may have symmetrical shapes corresponding to each other. In an embodiment, among the first-row and second-row coupling pads P11, P21, P12, and P22, the outermost coupling pads P1E and P2E and the inner coupling pads P1N and P2N in the first direction Z1 may have different shapes. For example, the outermost coupling pads P1E and P2E, which support a relatively large load, may have a length greater than a length of the inner coupling pads P1N and P2N to effectively cope with tension acting in the first direction Z1, for example, tension acting from the external connection terminal T. In this case, the length of coupling pads may refer to a size in the first direction Z1. For example, among the first coupling pads P1 formed on the main circuit board 100 and the second coupling pads P2 formed on the flexible circuit board 200, the outermost coupling pads P1E and P2E may be longer than the inner coupling pads P1N and P2N in the first direction Z1.

In an embodiment, for example, among the first coupling pads P1 formed on the main circuit board 100 and the second coupling pads P2 formed on the flexible circuit board 200, the outermost coupling pads P1E and P2E extend longer than the inner coupling pads P1N and P2N in the first direction Z1. For example, the length of each of the outermost coupling pads P1E and P2E in the first direction Z1, that is, the length between the outer and inner end portions of each of the outermost coupling pads P1E and P2E in the first direction Z1, may be greater than the length of each of the inner coupling pads P1N and P2N in the first direction Z1, that is, the length between outer and inner end portions of each of the inner coupling pads P1N and P2N in the first direction Z1. In an embodiment, each of the outermost coupling pads P1E and P2E may be formed in a rectangular shape in which the length in the first direction Z1 is greater than the width in the second direction Z2, and each of the inner coupling pads P1N and P2N may be formed in a square (square or substantially square) shape in which the length in the first direction Z1 is equivalent (similar or equal) to the width in the second direction Z2. In other words, among the first coupling pads P1 formed on the main circuit board 100 and the second coupling pads P2 formed on the flexible circuit board 200, the outermost coupling pads P1E and P2E may have a rectangular shape, and the inner coupling pads P1N and P2N may have a square shape. In an embodiment, the outermost coupling pads P1E and P2E may have a rectangular shape having round corners, and the inner coupling pads P1N and P2N may have a square shape having round corners.

Throughout the present specification, coupling pads may refer to the first coupling pads P1 formed on the main circuit board 100 and the second coupling pads P2 formed on the flexible circuit board 200, and may be structures for physically coupling the main circuit board 100 and the flexible circuit board 200 to each other by applying a molten or semi-molten bonding material 150, such as a soldering material, to the first coupling pads P1 of the main circuit board 100 or the second coupling pads P2 of the flexible circuit board 200, or between the first coupling pads P1 of the main circuit board 100 and the second coupling pads P2 of the flexible circuit board 200. In this case, the coupling pads may include a metallic material having an affinity or wettability with the bonding material 150, such as a soldering material.

In an embodiment, coupling holes P2' may be formed in the second coupling pads P2 of the flexible circuit board 200 to expose the first coupling pads P1 of the main circuit board 100, and the first and second coupling pads P1 and P2 may be coupled to each other by forming the bonding material 150, such as a soldering material, on the second coupling pads P2 and the first coupling pads P1 exposed through the coupling holes P2' or allowing the bonding material 150 to permeate between the first and second coupling pads P1 and P2.

The first and second coupling pads P1 and P2 may be respectively formed on the main circuit board 100 and the flexible circuit board 200 at positions corresponding to each other and overlapping each other, and the first and second coupling pads P1 and P2 may be coupled to each other. In an embodiment, the second coupling pads P2 may include the coupling holes P2' to expose portions of the first coupling pads P1. The bonding material 150, such as a soldering material, may be accumulated on the first coupling pads P1 exposed through the bonding hole P2', and the first and second coupling pads P1 and P2 may be coupled to each other by the bonding material 150 accumulated on the first and second coupling pads P1 and P2. In this case, the soldering material accumulated on the first and second coupling pads P1 and P2 may permeate between the first and second coupling pads P1 and P2 such that the first and second coupling pads P1 and P2 may be coupled to each other.

In an embodiment, the coupling holes P2' formed in the second coupling pads P2 of the flexible circuit board 200 may have different shapes in the outermost coupling pads P2E and the inner coupling pads P2N in the first direction Z1. For example, the coupling holes P2' formed in the outermost coupling pads P2E may have end portions of which widths in the first direction Z1 are increased from an open side in a second direction Z2 in end portions at which the coupling holes P2' end in the second direction Z2; and the inner coupling pads P2N may have end portions of which widths in the first direction Z1 are decreased from an open side in a second direction Z2 in end portions at which the inner coupling pads P2N end in the second direction Z2.

For example, the coupling holes P2' formed in the outermost coupling pads P2E of the second coupling pads P2 formed on the flexible circuit board 200 may have end portions of which widths in the first direction Z1 are increased from an open side in a second direction Z2 in end portions at which the coupling holes P2' end in the second direction Z2. In an embodiment, each of the coupling holes P2' formed in the outermost coupling pads P2E of the second coupling pads P2 may have an end portion at which the coupling hole P2' ends in the second direction Z2, each of the coupling holes P2' may be elongated in the first direction Z1 and have round ends at both, or opposite, ends in the first direction Z1. Throughout the present specification, it is described that the coupling holes P2' (outermost coupling holes P2') formed in the outermost coupling pads P2E of the second coupling pads P2 have end portions of which widths are increased, or the coupling holes P2' (inner coupling holes P2') of the inner coupling pads P2N of the second coupling pads P2 have end portions of which widths are decreased, and, in this case, the expression "increased width" or "decreased width" means that when a coupling hole P2' has an end portion at which the coupling hole P2' ends in the second direction Z2, the width of at least some of the end portion is increased or decreased from an open side in the second direction Z2. As described above the outermost coupling holes P2' having end portions of which widths are increased may be longer in the first direction Z1 than the inner coupling holes P2' having end portions of which widths are decreased.

In an embodiment, the outermost coupling holes P2' may be relatively long to effectively resist against tension acting in the first direction Z1. In an embodiment, for example, the outermost coupling holes P2' relatively close to the external connection terminal T in the first direction Z1 are longer than the inner coupling holes P2' relatively distant from the external connection terminal T in the first direction Z1, such that even when tension acts on the flexible circuit board 200 via the external connection terminal T, the coupling between the flexible circuit board 200 and the main circuit board 100 may not be damaged. For example, the coupling holes P2', which are relatively long in the first direction Z1, have an effect of increasing the areas of the first coupling pads P1 exposed through the coupling holes P2' and the area of the bonding material 150, such as a soldering material, and, thus, resistance against tension acting in the first direction Z1 may be improved because the strength coupling between the flexible circuit board 200 and the main circuit board 100 is increased due to the increased area of the bonding material 150.

As described above, in an embodiment, according to the positions of the coupling holes P2' in the first direction Z1, the outermost coupling holes P2' are relatively long, and the inner coupling holes P2' are relatively short. In an embodiment, the outermost coupling holes P2' may have end portions of which widths in the first direction Z1 are increased, and the inner coupling holes P2' may have end portions of which widths in the first direction Z1 are decreased, such that the lengths of the outermost coupling holes P2' may be different from the lengths of the inner coupling holes P2'. In other words, according to an embodiment, the outermost coupling holes P2' and the inner coupling holes P2' may have different shapes and sizes.

In an embodiment, the outermost coupling holes P2' may be formed in the second coupling pads P2, that is, in the outermost coupling pads P2E, at relatively inner positions thereof in the first direction Z1, and the inner coupling holes P2' may be formed in the second coupling pads P2, that is, in the inner coupling pads P2N, at relatively central positions thereof in the first direction Z1. For example, the inner coupling holes P2' may be formed at center positions of the second coupling pads P2 in the first direction Z1, that is, at center positions between outer and inner end portions of the second coupling pads P2 in the first direction Z1 from the main circuit board 100 toward the flexible circuit board 200.

In an embodiment, unlike the inner coupling holes P2', the outermost coupling holes P2' may be formed at inner positions of the second coupling pads P2 in the first direction Z1, that is, at positions of the second coupling pads P2 which are closer to inner end portions of the second coupling pads P2 than outer end portions of the second coupling pads P2 in the first direction Z1 from the main circuit board 100 to the flexible circuit board 200. That is, the position of each of the outermost coupling holes P2' in a second coupling pad P2 may be determined such that a distance (outer distance) LE from the coupling hole P2' to the outer end portion of the second coupling pad P2 is greater than a distance (inner distance) LN from the coupling hole P2' to the inner end portion of the second coupling pad P2.

The coupling holes P2' are positions at which the bonding material 150 is formed on the first coupling pads P1 exposed from the second coupling pads P2, and may correspond to center positions of portions of the bonding material 150 formed on the first and second coupling pads P1 and P2, and, in this regard, the coupling holes P2' may correspond to the coupling positions of the first and second coupling pads P1 and P2 or the center positions of coupling between the first and second coupling pads P1 and P2. In an embodiment, when the bonding material 150 is formed on the first and second coupling pads P1 and P2, the bonding material 150 may be highest at the positions of the bonding holes P2'.

The outer distance LE and the inner distance LN of the second coupling pads P2 may correspond to portions of the second coupling pads P2 which are outside the coupling holes P2', and when the coupling holes P2' are considered as the coupling positions of the first and second coupling pads P1 and P2, the portions of the second coupling pads P2 may extend away from the coupling positions (coupling holes P2') of the first and second coupling pads P1 and P2 along the outer distance LE and the inner distance LN of the second coupling pads P2. In this case, portions of the second coupling pads P2 extending outside the coupling holes P2' along the outer distance LE may be longer than portions of the second coupling pads P2 extending outside the coupling holes P2' along the inner distance LN.

The portions of the second coupling pads P2 which are outside the coupling positions of the first and second coupling pads P1 and P2 may impart rigidity to the flexible circuit board 200 against bending of the flexible circuit board 200 when the flexible circuit board 200 is bent in a direction away from the main circuit board 100, and, thus, since the portions of the second coupling pads P2 bear the bending force, the other portions of the second coupling pads P2 may not be damaged. In other words, the outer distance LE, which is relatively long, has an effect of providing rigidity against bending of the flexible circuit board 200 when the flexible circuit board 200 is bent in a direction away from the main circuit board 100, and, thus, it is possible to resist the bending of the flexible circuit board 200 and prevent or substantially prevent damage to the flexible circuit board 200.

For example, when the flexible circuit board 200 is bent in a direction away from the main circuit board 100, the flexible circuit board 200 may be bent off the main circuit board 100 up to the coupling positions (corresponding to the coupling holes P2') of the first and second coupling pads P1 and P2, and, in this case, the portions of the second coupling pads P2 (for example, corresponding to the outer distance LE of the second coupling pads P2), which are outside the coupling positions (corresponding to the coupling holes P2') of the first and second coupling pads P1 and P2, may resist the bending force, such that force acting on the other portion of the flexible circuit board 200 may be low and the flexible circuit board 200 may not be damaged. In this case, the second coupling pads P2 formed on the flexible circuit board 200 for coupling with the first coupling pads P1 formed on the main circuit board 100 may also function as a strength enhancement layer which imparts rigidity to the flexible circuit board 200 against bending of the flexible circuit board 200.

The first and second coupling pads P1 and P2 may be coupled to each other through the bonding material 150, such as a soldering material, formed on the first and second coupling pads P1 and P2, and the first and second coupling pads P1 and P2 may include a metallic material having an affinity or wettability with the bonding material 150. In this case, the second coupling pads P2 (for example, the portions of the second coupling pads P2 along the outer distance LE), which include the metallic material and are formed on the flexible circuit board 200 of a flexible film type, may supplement the rigidity of the flexible circuit board 200 against bending of the flexible circuit board 200.

Referring to FIG. 3, the first coupling pads P1 formed on the main circuit board 100 may include the first-row coupling pads P11 and the second-row coupling pad P12, and the second coupling pads P2 formed on the flexible circuit board 200 may include the first-row coupling pads P21 and the second-row coupling pad P22. In addition, outermost coupling pads PE in the first direction Z1 may include: the outermost coupling pads P1E among the first coupling pads P1 formed on the main circuit board 100; and the outermost coupling pads P2E among the second coupling pads P2 formed on the flexible circuit board 200. Similarly, inner coupling pads PN in the first direction Z1 may include: the inner coupling pads P1N among the first coupling pads P1 formed on the main circuit board 100; and the inner coupling pads P2N among the second coupling pads P2 formed on the flexible circuit board 200.

Referring to FIG. 1, in an embodiment, insulating tapes 20 may be attached along edges of the battery cell C, and an insulating adhesive tape 30 may be arranged between the terrace portion 11 of the battery cell C, the main circuit board 100, and the flexible circuit board 200 for insulative coupling therebetween. In an embodiment, an insulating member 80 may be attached to the main circuit board 100 and the flexible circuit board 200 to insulate and protect the main circuit board 100 and the flexible circuit board 200 from a surrounding environment. Referring to FIG. 1, in an embodiment, a label sheet 51 may be attached to the battery cell C to insulate and protect the battery cell C and, for example, to provide a region for indicating product information, such as a model name or manufacturer of the battery cell C.

As described above, according to the one or more of the embodiments, the rigidity of the flexible circuit board 200 connected to the external connection terminal T is enhanced such that even when tensile or bending force is applied to the flexible circuit board 200 through the external connection terminal T, the flexible circuit board 200 connected to the external connection terminal T may not be damaged or the coupling between the flexible circuit board 200 and other circuit boards may not be damaged.

It is to be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as set forth by the following claims.

What is claimed is:

1. A battery pack comprising:
a battery cell; a main circuit board electrically connected to the battery cell and extending in a first direction that is a lengthwise direction of the main circuit board; and a flexible circuit board extending in the first direction in parallel with the main circuit board and comprising an external connection terminal located at a position outside the main circuit board in a second direction crossing the first direction,
wherein the main circuit board and the flexible circuit board respectively comprise a plurality of first coupling pads and a plurality of second coupling pads which overlap each other in a third direction crossing each of the first direction and the second direction and are coupled to each other, and
wherein a number of each of the first and second coupling pads arranged along the first direction in a first row that is relatively close to the external connection terminal in the second direction is greater than a number of each of the first and second coupling pads arranged along the first direction in a second row that is relatively distant from the external connection terminal in the second direction.

2. The battery pack of claim 1, wherein the plurality of first coupling pads on the main circuit board and the plurality of second coupling pads on the flexible circuit board are at positions corresponding to each other and have different shapes.

3. The battery pack of claim 1, wherein
the plurality of first coupling pads on the main circuit board comprises a first-row coupling pad and a second-row coupling pad which are spaced from each other in the second direction, and
the plurality of second coupling pads on the flexible circuit board comprises a first-row coupling pad and a second-row coupling pad which are spaced from each other in the second direction.

4. The battery pack of claim 3, wherein, among the plurality of first coupling pads of the main circuit board and the plurality of second coupling pads of the flexible circuit board, each of the first-row coupling pads arranged relatively close to the external connection terminal in the second direction comprises at least two coupling pads arranged in the first direction.

5. The battery pack of claim 3, wherein, among the plurality of first coupling pads of the main circuit board and the plurality of second coupling pads of the flexible circuit board, each of the second-row coupling pads arranged relatively distant from the external connection terminal in the second direction comprises a single coupling pad arranged in the first direction.

6. The battery pack of claim 3, wherein
the plurality of first coupling pads of the main circuit board comprises an outermost coupling pad and an inner coupling pad in the first direction from the main circuit board to the flexible circuit board, and
the plurality of second coupling pads of the flexible circuit board comprises an outermost coupling pad and an inner coupling pad in the first direction from the main circuit board to the flexible circuit board.

7. The battery pack of claim 6, wherein the outermost coupling pads are longer than the inner coupling pads in the first direction.

8. The battery pack of claim 6, wherein, among the plurality of first coupling pads of the main circuit board and the plurality of second coupling pads of the flexible circuit board, each of the first-row coupling pads comprises an outermost coupling pad and an inner coupling pad in the first direction.

9. The battery pack of claim 6, wherein, among the plurality of first coupling pads of the main circuit board and the plurality of second coupling pads of the flexible circuit board, each of the second-row coupling pads comprises a single coupling pad in the first direction as an outermost coupling pad.

10. The battery pack of claim 6, wherein outermost coupling pads of the first-row coupling pads and outermost coupling pads of the second-row coupling pads are located at positions corresponding to each other in the first direction.

11. The battery pack of claim 6, wherein
among the plurality of first coupling pads of the main circuit board and the plurality of second coupling pads of the flexible circuit board,
the outermost coupling pads have a rectangular shape with a length in the first direction being greater than a width in the second direction, and
the inner coupling pads have a square shape with a length in the first direction being equivalent to a width in the second direction.

12. The battery pack of claim 1, wherein coupling holes are formed in the plurality of second coupling pads of the flexible circuit board to expose portions of the plurality of first coupling pads of the main circuit board through the coupling holes.

13. The battery pack of claim 12, wherein the main circuit board and the flexible circuit board are coupled to each other via a bonding material which is on the plurality of first coupling pads exposed through the coupling holes and which is on the plurality of second coupling pads around the coupling holes.

14. The battery pack of claim 12, wherein
the plurality of second coupling pads of the flexible circuit board comprises an outermost coupling pad and an inner coupling pad in the first direction, and
the coupling holes comprise an outermost coupling hole formed in the outermost coupling pad and an inner coupling hole formed in the inner coupling pad.

15. The battery pack of claim 14, wherein the outermost coupling hole extends longer than the inner coupling hole in the first direction.

16. The battery pack of claim 15, wherein
the outermost coupling hole comprises an end portion having a width in the first direction that increases from an open side thereof in the second direction, and
the inner coupling hole comprises an end portion having a width in the first direction that decreases from an open side thereof in the second direction.

17. The battery pack of claim 16, wherein the end portion having an increased width and the end portion having a decreased width are end portions at which the outermost coupling hole and the inner coupling hole respectively end in the second direction.

18. The battery pack of claim 14, wherein the outermost coupling hole is elongated in the first direction and comprises round end portions at opposite ends thereof in the first direction.

19. The battery pack of claim 14, wherein the outermost coupling hole is formed in the outermost coupling pad at a relatively inner position of the outermost coupling pad in the first direction.

20. The battery pack of claim 19, wherein the outermost coupling hole is formed at a position closer to an inner end portion of the outermost coupling pad than to an outer end portion of the outermost coupling pad in the first direction from the main circuit board to the flexible circuit board.

21. The battery pack of claim 20, wherein an outer distance from the outermost coupling hole to the outer end portion of the outermost coupling pad is greater than an inner distance from the outermost coupling hole to the inner end portion of the outermost coupling pad.

22. The battery pack of claim 14, wherein the inner coupling hole is formed in the inner coupling pad at a center position of the inner coupling pad in the first direction.

23. The battery pack of claim 22, wherein the inner coupling hole is formed at a center position between an outer end portion and an inner end portion of the inner coupling pad in the first direction from the main circuit board to the flexible circuit board.

24. The battery pack of claim 1, wherein
the main circuit board comprises a rigid circuit board, and
the flexible circuit board comprises a flexible film type circuit board.

* * * * *